(12) United States Patent
Tan et al.

(10) Patent No.: US 11,783,574 B2
(45) Date of Patent: Oct. 10, 2023

(54) ARTIFICIAL INTELLIGENCE BASED REAL TIME VEHICLE PARKING VERIFICATION

(71) Applicant: NEUTRON HOLDINGS, INC., San Francisco, CA (US)

(72) Inventors: Jinsong Tan, San Francisco, CA (US); Yi Su, San Francisco, CA (US); Andrew Hanlin Xia, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 184 days.

(21) Appl. No.: 17/190,154

(22) Filed: Mar. 2, 2021

(65) Prior Publication Data
US 2021/0272459 A1 Sep. 2, 2021

Related U.S. Application Data

(60) Provisional application No. 62/984,263, filed on Mar. 2, 2020.

(51) Int. Cl.
*G06V 20/10* (2022.01)
*G06V 10/764* (2022.01)
*G06Q 30/018* (2023.01)
*G08G 1/14* (2006.01)
*G06V 10/82* (2022.01)

(52) U.S. Cl.
CPC ............ *G06V 20/10* (2022.01); *G06V 10/764* (2022.01); *G06V 10/82* (2022.01); *G06V 20/176* (2022.01); *G08G 1/142* (2013.01); *G08G 1/148* (2013.01)

(58) Field of Classification Search
None
See application file for complete search history.

(56) References Cited

U.S. PATENT DOCUMENTS

| 2014/0015974 | A1 | 1/2014 | Nagy | |
| 2015/0009047 | A1* | 1/2015 | Ashkenazi | G08G 1/0175 340/932.2 |
| 2016/0078299 | A1 | 3/2016 | Nerayoff et al. | |
| 2019/0009713 | A1 | 1/2019 | Pal et al. | |
| 2021/0233198 | A1* | 7/2021 | Wells | H04L 67/306 |

FOREIGN PATENT DOCUMENTS

DE 102015008422 B3 10/2016

* cited by examiner

*Primary Examiner* — John F Mortell
(74) *Attorney, Agent, or Firm* — Dentons US LLP

(57) ABSTRACT

Properly parking personal mobility vehicles (PMVs) is an important for safety and public satisfaction. The large number of daily rides of ride-share PMVs makes it impossible to verify manually that each PMV is properly parked. Aspects of this disclosure include systems and methods for verifying that PMVs are properly parked. These systems and methods can include training a machine learning model on a server. The system can request that users submit images to the server, such that the server can verify that the user properly parked the PMV. The server can transmit a finished indication when it determines that the user properly parked the vehicle. The server can transmit instructions to the user to take various actions when it determines that the user improperly parked the vehicle or when the image is insufficient to determine whether the user properly parked the vehicle.

20 Claims, 4 Drawing Sheets

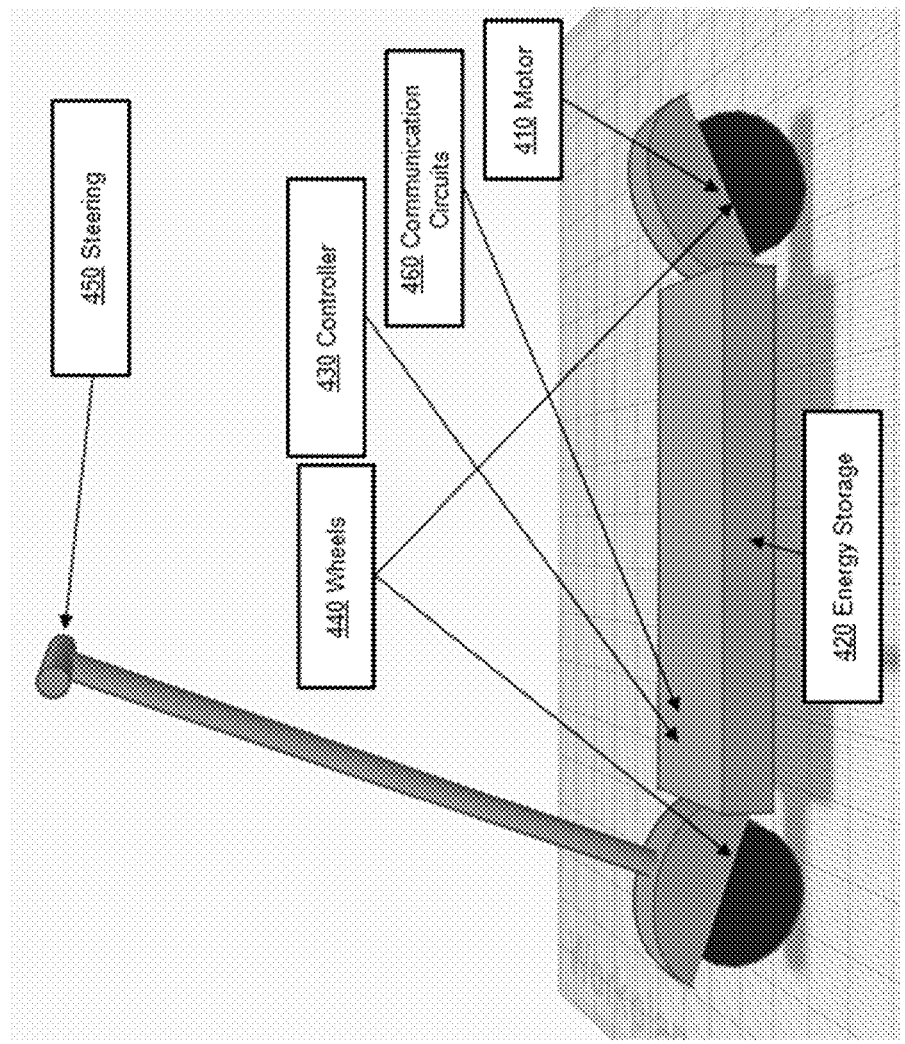

ARTIFICIAL INTELLIGENCE BASED REAL TIME VEHICLE PARKING VERIFICATION

CROSS-REFERENCE TO RELATED APPLICATIONS

This application claims priority to and the benefit of U.S. Provisional Application No. 62/984,263, filed Mar. 2, 2020, the disclosure of which is hereby incorporated by reference herein in its entirety.

BACKGROUND

This specification relates to processing images using a machine learning model to enforce vehicle parking rules.

Personal mobility vehicles (PMVs) can be classified as a form of transportation that gives rapid mobility to users over short-to-medium distances, for example, between 0.5 miles and 3 miles. PMVs are often electrified vehicles that are intended for a single rider, such as electric scooters, electric skateboards, and electric bikes. A PMV may be of particular advantage in urban environments where they permit rapid movement between mass transportation hubs and residences, work locations, recreational areas, or commerce areas.

PMV operation in areas of high population density can create negative interactions, such as accidents and injuries. PMV's obstructing the middle of sidewalks may obstruct pedestrian traffic or disabled vehicle traffic. PMV's parked too close to edge of the sidewalks may fall into the main road and obstruct traffic.

PMV's are often left in public before, between and after trips. Riders may leave the PMV's at locations of convenience after each trip. PMV rental/sharing companies' personnel may also leave the PMV's at locations of likely use at any time. For purpose of exemplary illustration, PMV riders and PMV rental/sharing companies' personnel may be collectively referred to as "users". For PMV to operate in compliance to the locally defined and regulated operation rules, PMV parking may need to follow some general rules or local rules for safety and convenience purposes.

To ensure compliance of PMV parking rules, PMV operating companies often must rely upon manual vehicle parking image validations, and sometimes with additional user incentives for good parking. However, all of these measures are resource and time intensive.

Thus, it may be advantageous to provide a system and method of validating vehicle parking using machine learning models.

SUMMARY

Provided herein are systems and methods that use machine learning models to validate vehicle parking according parking rules.

The systems and methods of the present disclosure may be of particular advantage in areas with high PMV usage, particularly to aid PMV operating companies and local governments in enforcing local PMV parking rules.

Machine learning models may receive an input and generate an output, e.g., a predicted output, based on the received input. Some machine learning models may be parametric models and may generate the output based on the received input and on values of the parameters of the model.

Some machine learning models may be deep models that employ multiple layers of models to generate an output for a received input. For example, a deep neural network is a deep machine learning model that may include an output layer and one or more hidden layers that each apply a non-linear transformation to a received input to generate an output.

Some neural networks may be recurrent neural networks. A recurrent neural network is a neural network that receives an input sequence and generates an output sequence from the input sequence. In particular, a recurrent neural network uses some or all of the internal state of the network after processing a previous input in the input sequence in generating an output from the current input in the input sequence.

A PMV parking image analysis system can automatically and effectively analyze one or more images of a parked PMV and its background to validate good PMV parking. In particular, the PMV parking image analysis system may analyze the images using multiple sets of models based on multiple sets of parking rules, to detect for example, when the images are sufficiently high quality for accurate determination of parking validation, when the PMV is parked too close to the edge of the sidewalk, when the PMV is obstructing the middle of the sidewalk and is obstructing pedestrian traffic, or when the PMV is left upright, etc.

Embodiments can include, for example, a server that receives a collection of images of PMVs to train a machine learning model to determine whether a parked PMV is parked according to a plurality of parking rules. The images may be assigned values of improper parking, and may include values from, for example, 1-5 corresponding to how poorly/well the PMV is parked. The server may use the images to generate the machine learning model and determine whether the parked PMV is parked according to the plurality of parking rules. The parking rules can include, for example, whether the parked PMV is parked too close to an edge of a sidewalk, that the parked PMV is obstructing a middle of a sidewalk, that the parked PMV is obstructing pedestrian traffic, and that the parked PMV is left upright. The server may then send a completion indication to a user's mobile device, which indicates that the user has completed a trip on the parked PMV. The server may then send a request to the user's device, in response to the completion indication, for an image of the parked PMV. Alternatively, a mobile application of the user's device may automatically request an image of the parked PMV in response to the user indicating that they are completed with a ride on the PMV. The mobile application may then display a camera interface configured to obtain the image of the parked PMV, wherein the camera interface comprises a frame for taking the image of the parked PMV. The mobile application then receives the image of the parked PMV from the camera interface, and transmits the image of the parked PMV to a server. The server may then input the image into the machine learning model to determine whether the parked PMV satisfies the plurality of parking rules. The server and the machine learning model can then generate an indication of whether the parked PMV satisfies the plurality of parking rules. The server and machine learning model can do this by, for example, having the machine learning model provide a binary output: parked properly or improperly. In addition, the server and machine learning model may determine an improper parking score by assessing a plurality of parking requirements. The server can then sum these scores and compare the sum to a predetermined score. The server may then transmit the indication of whether the parked PMV satisfies the plurality of parking rules. The indication can include, for example, an instruction to repark the parked PMV when the parked PMV does not satisfy one or more of the plurality of parking rules. Alternatively, the indication can include an instruction to take another image when the machine learning model cannot determine whether the parked PMV satisfies one or more of the plurality of parking rules. In another example, the indication can include a finished indication when the machine learning model determines that the parked PMV satisfies the plurality of parking rules.

BRIEF DESCRIPTION OF THE DRAWINGS

FIG. 4 illustrates an exemplary PMV with exemplary components detailed.

DETAILED DESCRIPTION

The present disclosure provides systems and methods of improved detection of personal mobility vehicles (PMV) entering or exiting operation zones. In some instances, it may be advantageous to limit the maximum operational speed of PMVs in areas of high pedestrian density/traffic to minimize the likelihood of pedestrian-vehicle accidents or encounters, or in areas of bad road condition. In other instances, local regulations may prohibit the operation of PMVs in some areas. In other instances, such restrictions or prohibitions may be temporary or imposed according to some schedule.

PMVs may be considered a particular class of vehicular transport for short to medium distances. In many instances, they are electrically powered, wheeled transportation devices with a range from several city blocks to a few miles. PMVs are often arranged in shared networks whereby a user can locate a PMV via a mobile app and use it to move from their present location to a nearby second location (or in some cases, to sequential multiple locations). The PMV can then be left for a subsequent user at the second location. PMV networks are increasingly common in urban areas where PMV use can coincide with heavy local traffic and traffic congestions. In many cases, it may be advantageous to restrict PMV maximum speed in some areas for safety reasons.

Figure 1:
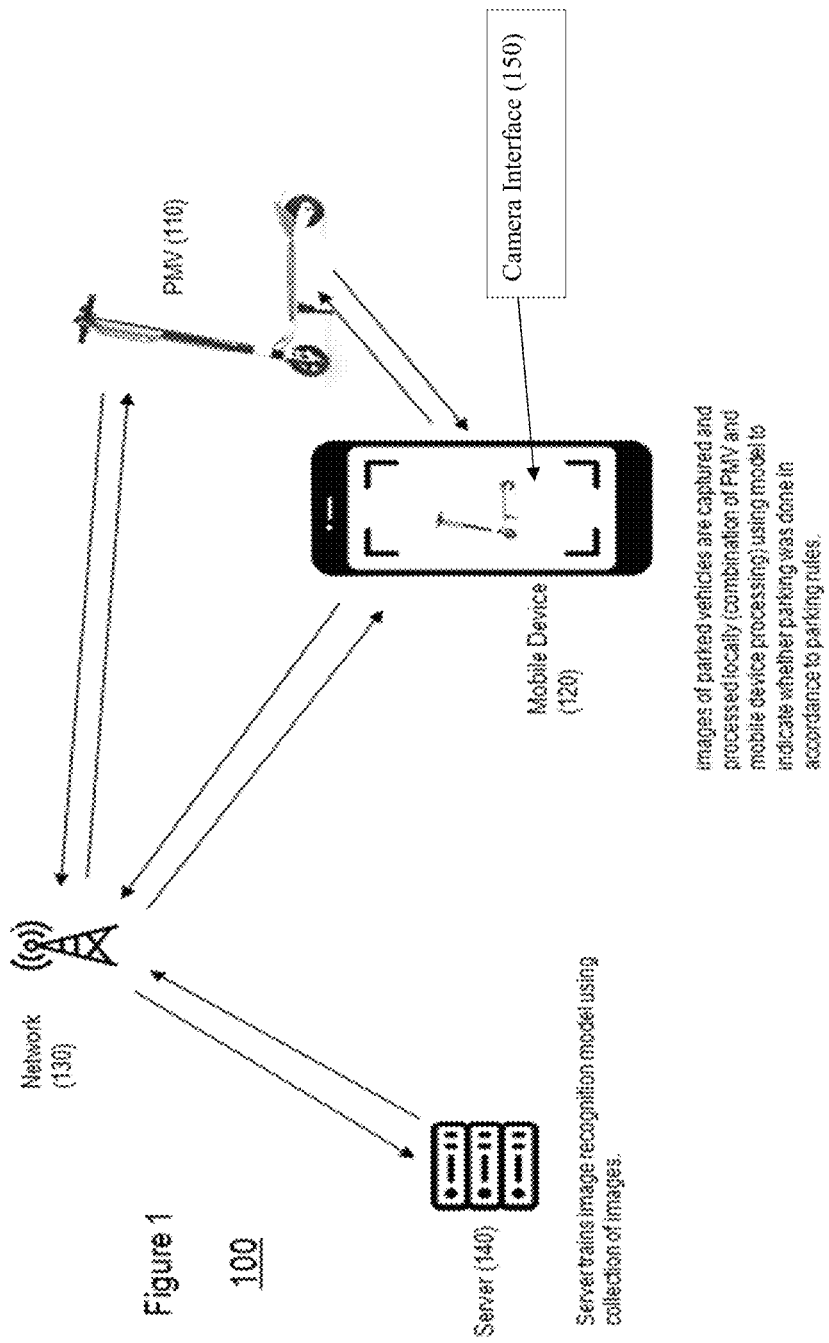
FIG. 1 illustrates an exemplary system with machine learning model based validation of PMV parking.

FIG. 1 illustrates an exemplary system (100) with improved detection of PMV entering or exiting an operation zone, as might be found in a typical urban environment. According to some embodiments of the present disclosure, a user may be using a PMV (110), here illustrated as a scooter for example, to travel during a trip. The user may use a mobile device (120), which may contain a camera, to access and use the PMV (110). The mobile device (120) may be used to capture image data of the PMV (110) in a parked state using a camera on the mobile device (120). The mobile device (120) may further capture motion data and orientation data using components such as an accelerometer, to be used to augment the image data processing. The mobile device (120) may be connected to the PMV (110) directly or indirectly via a local wireless connection, such as a WiFi connection, or a Bluetooth connection, or a RFID connection, or a nearfield-communication connection. The mobile device (120) and the PMV (110) may be connected to a server (140) via a network (130).

In some embodiments, the server (140) may contain an image processor with a machine learning model, which may be a deep convolutional neural network that is configured to receive and process an image to generate a model output related to the validation of a PMV's parking, such as whether the PMV is validated as having good parking, an image error code indicating issues relating to the image being insufficient for proper analysis, and/or a vehicle parking error code indicating that the PMV parking is violating one or more parking rules. If the image processing machine learning model detects that the image data is still insufficient for proper analysis, because of poor lighting, improper orientation of view, or too close or too far from the vehicle in view, it may generate model output portion related to the image error code. The mobile device (120) may then prompt the user to capture additional image data with more or less lighting, and different orientation or viewing distance. If the image processing machine learning model detects that the PMV is improperly parked, due to being too close to the edge of the sidewalk, or being obstructing pedestrian traffic, then a vehicle parking error may be generated. The model may determine these factors by, for example, being trained on a dataset of images if improperly parked PMVs. For example, a PMV in the middle of a sidewalk rather than on the side may be assigned an identification if improper parking. The system may also assign values to determine an improper parking score. Example values can be on a 1-5 range for distance from an optimal parking location, e.g., not in the middle and not about to fall into a road. Other values can include how far the PMV is leaning, how close it is to a door or driveway, whether it is near a bike stand or tree, or whether it is near another high-traffic area, such as a park entrance. The values can be added to determine the improper parking score, and if they exceed (or do not meet) a predetermined score, the system may determine that the PMV is improperly parked.

The mobile device (120) may then prompt the user to repark the PMV and capture additional image data. When the image processing machine learning model validates the PMV's parking, and it may generate a model output, then the mobile device (120) may prompt the user to indicate a successful PMV parking validation. For example, the mobile device (120) may have a virtual image (watermark) capture target frame outline displayed over the camera image view, to allow a user to properly aim the camera using a camera interface (150). If the PMV parking validation is successful, the virtual image capture target frame outline may indicate so by changing color, for example to green. Other indications of successful PMV parking validation may also be possible, such as sound patterns or vibration patterns generated by the mobile device (120) or the PMV (110).

In application, the server (140) may receive image data from the mobile device (120) after the mobile device (120) captures a PMV parking image with a camera using a camera interface (150), and then may process the image data to generate a model output to validate a PMV's parking based on the image data. The server (140) may be fed a collection of image data to train the image processing machine learning model, and new additional image data may be used to further train and retune the image processing machine learning model over time, such that the machine learning model is trained to identify improper parking. Once the server (140) generates the model output, it may send the model output to the mobile device (120) and/or the PMV (110), as feedback to the user, and/or as command code to the mobile device (120) and/or the PMV (110). The command code may be used to validate parking, to complete a trip, and/or to change the operating status of the PMV (110) to indicate the PMV is parked.

In some embodiments, for efficiency of operation, the image processing machine learning model may be replicated and/or updated in part or in all in the mobile device (120), such that the mobile device (120) may perform the image processing after the mobile device (120) captures a PMV parking image with a camera using a camera interface 150 using a camera interface 150. Then, the mobile device (120) may generate the model output and send the model output to the server (140) and/or the PMV (110), as feedback to the user, and/or as command code to the mobile device (120) and/or the PMV (110). The command code may be used to validate parking, to complete a trip, and/or to change the operating status of the PMV (110). In this manner, the mobile device (120) may perform the initial image capture and the model output, and may avoid any system or network lag related to sending the image data to the server (140) in generating the model output. However, the image data may still be sent to the server (140) later for further training of the image processing machine learning model.

In some embodiments, for security of operation, the image processing machine learning model may be replicated and/or updated in part or in all in the PMV (110), such that the PMV (110) may perform the image processing, after the mobile device (120) captures a PMV parking image with a camera and then sends the image data to the PMV (110). Then, the PMV (110) may generate the model output and send the model output to the server (140) and/or the mobile device (120), as feedback to the user, and/or as command code to the mobile device (120) and/or the PMV (110). The command code may be used to validate parking, to complete a trip, and/or to change the operating status of the PMV (110). In this manner, the PMV (110) may receive the image data locally from the mobile device (120) and may generate the model output, and may avoid any system or network lag related to sending the image data to the server (140) in generating the model output, and also may avoid any security issue with a mobile device (120) that allow a hacking or theft of the image processing machine learning model. However, the image data may still be sent to the server (140) later for further training of the image processing machine learning model.

In other embodiments, the image processing machine learning model may be split between the PMV (110), the mobile device (120), and/or the server (140), such that each may generate portion of the model output. For example, the mobile device (120) may contain portion of the image processing machine learning model to generate model output portion related to the image error code indicating issues relating to the image being insufficient for proper analysis. This may be done along with some initial pre-processing of the image that increases the quality of the image data. Optionally, prior to processing the image data using the machine learning model, there may be pre-processing of the images. For example, for a given image, image processing techniques may be applied to the image to improve the quality of the output generated by the machine learning model. As an example, the system may crop, scale, de-skew or re-center the image. As another example, the system can remove distortion from the image, e.g., to remove blurring or to re-focus the image, using image processing techniques. The PMV (110) may contain portion of the image processing machine learning model to generate model output portion related to the vehicle parking error code indicating that the PMV parking is violating one or more parking rules.

The server (140) may make the final determination of validating the PMV's parking, and send the final model output to the PMV (110) and/or the mobile device (120).

The convolutional neural network may include a set of convolutional neural network layers, a set of fully connected layers, and an output layer. It will be understood that, in practice, a deep convolutional neural network may include other types of neural network layers, e.g., pooling layers, normalization layers, and so on, and may be arranged in various configurations, e.g., as multiple modules, multiple subnetworks, and so on.

During the processing of an image by the convolutional neural network, the output layer may receive an output generated by the last fully connected layer in the set of fully connected layers and may generate the model output.

For an example, the image processing machine learning model may be a convolutional neural network that is configured through training to predict, for each pixel in the input image, the color of the pixel at the particular future time.

As another example, when the image data may include a temporal sequence of images, the image processing machine learning model may be a recurrent neural network that is configured through training to, for each pixel in the most recent image in the sequence, predict the color of the pixel at the particular future time. The system can use the predicted color values for the pixels to generate the predicted image.

The image data may include a temporal sequence of images in the form of a continuous video stream, where all individual images are processed individually. Additionally, the sequence of images may be processed together, to use motion prediction to improve quality of the individual images for machine learning model processing.

In particular, the machine leaning model may be a model that includes one or more initial convolutional layers followed by an attention mechanism, which in turn is followed by one or more additional neural network layers.

The initial convolutional layers process each image in the image data to extract a respective feature vector for each of multiple regions in the image.

The attention mechanism determines an attention weight for each of the regions in the image and then attends to the feature vectors in accordance with the corresponding attention weights to generate an attention output. Generally, the attention mechanism attends to the feature vectors by computing a weighted sum or a weighted mean of the feature vectors, with the weight for each feature vector being the attention weight for the corresponding region. To determine the attention weights, the system can use any of a variety of attention schemes to determine the relevance of each of the feature vectors to generating the model output for the image and then normalize the determined relevance to compute the attention weights. Example attention schemes include processing the feature vectors using one or more fully-connected layers to determine the relevance and determining the relevance of a given feature vector by computing a cosine similarity between the feature vector and a learned context vector.

The additional neural network layers that follow the attention mechanism receive the attention output(s) for each of the images and generate the model output from the attention output. For example, when the machine learning model is a recurrent neural network, the additional neural network layers include one or more recurrent layers. When the machine learning model is a convolutional neural network, the additional neural network layers can include convolutional neural network layers, fully-connected layers or other feedforward neural network layers.

Figure 2:
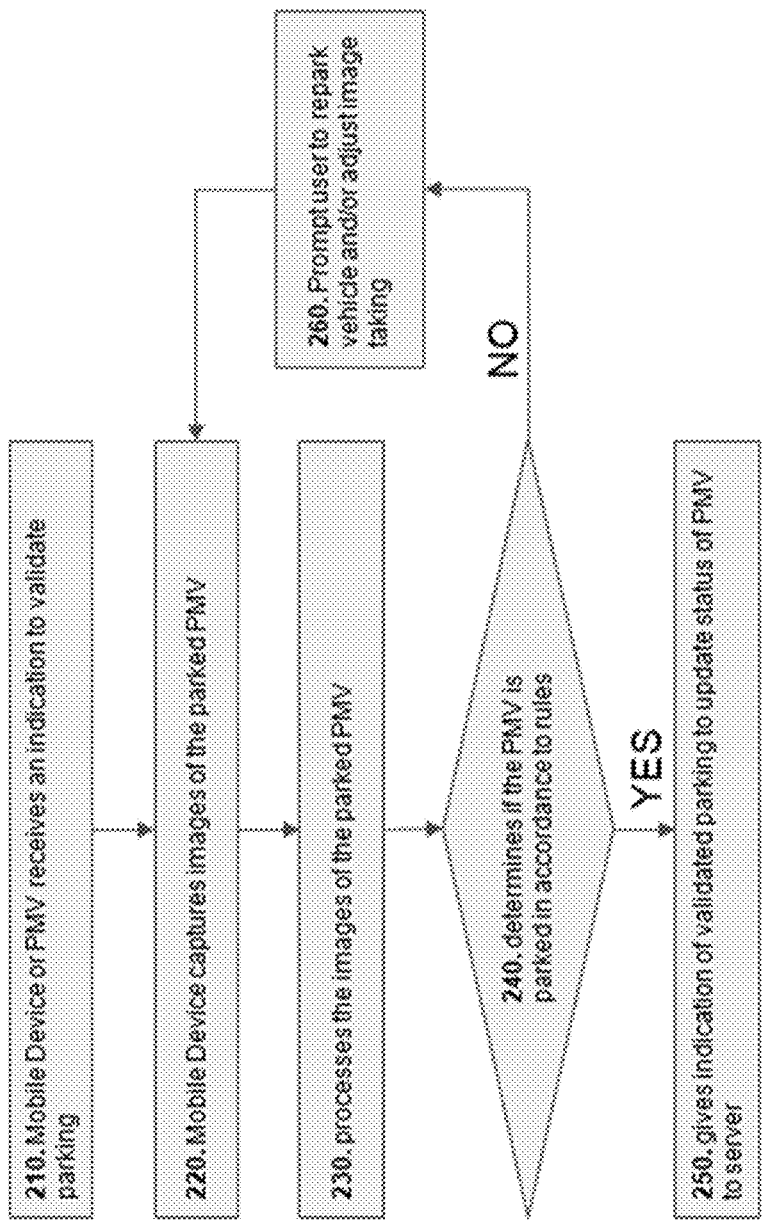
FIG. 2 illustrates a flowchart diagram representation of a method for machine learning model based validation of PMV parking.

FIG. 2 illustrates a flowchart diagram (200) representation of a method for machine learning model based validation of PMV parking.

At block (210), a mobile device (120) may receive an indication to validate a PMV's parking, this can occur when a user provides a completion indication, such as pressing an icon or button indicating that the user is done using the PMV. This may be in the form of a user command on an app on the mobile device (120) to end a trip and lock the PMV in parked state, thereby generating a completion indication.

At block (220), the mobile device (120) may capture image data of a PMV's parking via a camera using a camera interface 150. For example, an app on the mobile device (120) may turn on the camera of the mobile device (120) to start capturing image data continuously as a video stream. The user may hold the mobile device (120) to aim the camera view to capture the image data of a parked PMV. For ease of use, the app on the mobile device (120) may display a watermark image over the camera captured image data to aid the user to aim the camera view such that the image data of the parked PMV would be sufficiently high quality for analysis. For example, the displayed watermark image may be that of a frame, rectangular, square, circular or oval in shape. Alternatively, the displayed watermark image may be a rough or symbolic silhouette of a PMV, to guard the user on how to orient the camera view relative to the parked PMV, for best image analysis view angle.

At block (230), image data may be processed. For example, the continuous stream of image data of a parked PMV may be sent for processing in the mobile device (120), the PMV (110), and/or the server (140).

At block (240), the PMV (110), the mobile device (120), and/or the server (140) may determine if the PMV parking satisfies one or more rules, based on the image processing, and generate model output. The determination includes whether the PMV satisfies a plurality of parking rules, such as the parked PMV is parked too close to an edge of a sidewalk, that the PMV is obstructing the middle of the sidewalk, that the parked PMV is obstructing pedestrian traffic, and that the parked PMV is left upright. The result of this determination can be, for example, a finished indication or completion indication, indicating that the user rental or transaction is finished, or that the user has completed a ride. Alternatively, the system can determine that the PMV parking is unsatisfactory, and request an additional image having more lighting, or a different orientation of the PMV or viewing distance.

At block (250), if the PMV's parking is validated, indication is given to the PMV (110), the mobile device (120), and/or the server (140), and to update the status of the PMV. For example, the app on the mobile device (120) may display a graphic indication, such as a flashing watermark in a specific color (green for example) or a text, or give off a sound pattern or a vibration pattern to indicate to the user that the parking validation is successful.

At block (260), if the PMV's parking is not validated, mobile device (120) may prompt the user to repark the PMV and/or recapture image data. For example, the app on the mobile device (120) may display a graphic indication, such as a flashing watermark in a specific color (red for example) or an error message text, or give off a sound pattern or a vibration pattern to indicate to the user that the parking validation was not successful, to prompt the user to repark the PMV and/or recapture image data.

Figure 3:
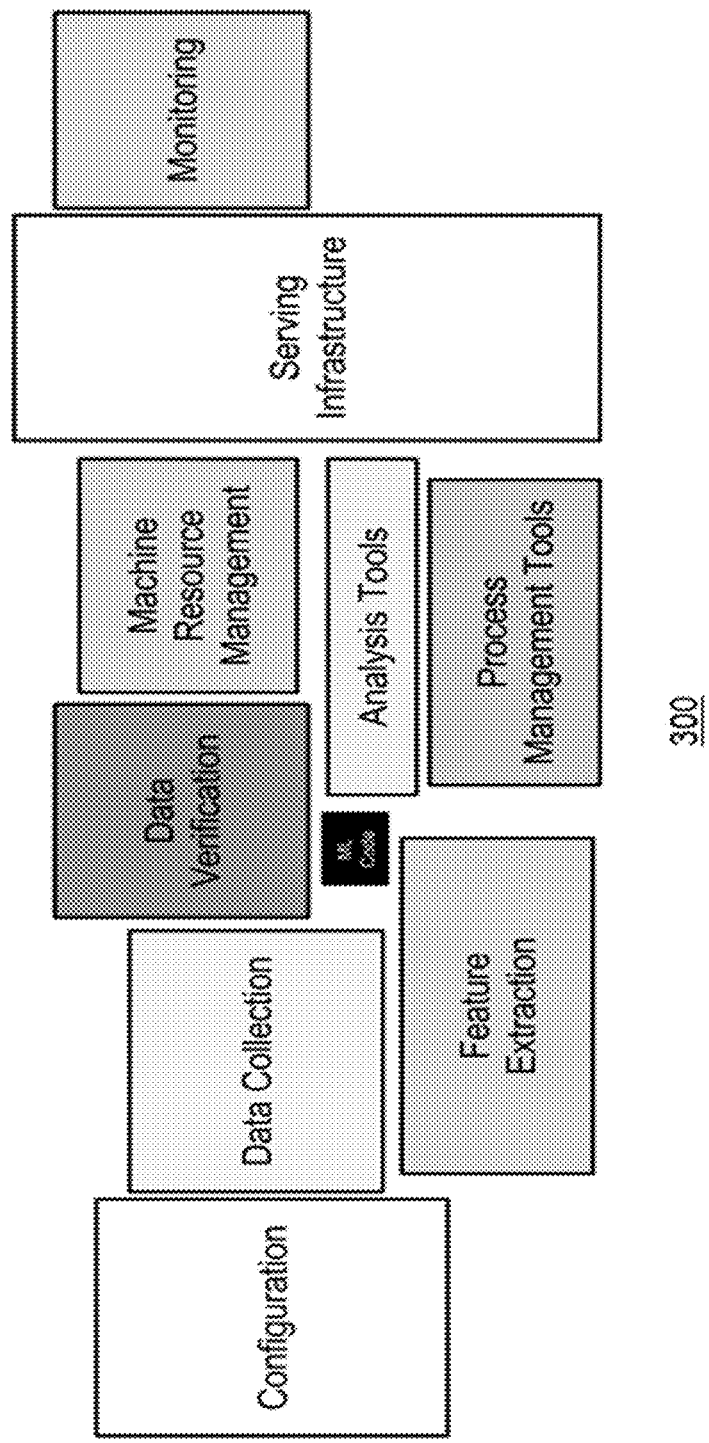
FIG. 3 illustrates an exemplary machine learning model based image processor used in validation of PMV parking.

FIG. 3 illustrates an exemplary machine learning model based image processor (300) used in validation of PMV parking.

In an embodiment, the exemplary machine learning model based image processor (300) may contain various model components, such as configuration, data collection, machine learning code, feature extraction, data verification, machine resource management, analysis tools, process management tools, serving infrastructure, and monitoring.

FIG. 4 illustrates an exemplary PMV embodiment (400) as described by the present disclosure. The PMV (400) may include a motor (410) that draws energy from an energy storage (420) to power movement of several wheels (440) of the PMV (400), and a steering (450) to allow directional control of the PMV (400). The PMV (400) may further include sensors (460) connected to a controller (430), and a memory (480) that stores various zone map data, zone operation rules, etc. The PMV (400) may include communication circuits (470) for communicating with networks and servers wirelessly.

In some instances, a PMV (400) may be coupled with a mobile device such as a mobile phone or tablet computer. The mobile device may be equipped with one or more sensors that are capable of collecting data, such as accelerometers, gyroscopes, microphones, cameras, and compasses. The mobile device may also be capable of wireless data transmission.

A gyroscope may also be disposed on the PMV (400). In these instances, the motion vector in the sensor data may be an angular velocity vector, and the magnitude of the motion vector may correspond to a magnitude of the angular velocity vector. The angular velocity vector may comprise a plurality of angular velocity components measured along different axes of the gyroscope.

A PMV (400) may include a compass or direction-determining sensor such as a 2-axis or 3-axis magnetometer. A magnetometer is a type of sensor that can be used to measure a direction and/or strength of a magnetic field in the vicinity of the sensor. An example of a magnetometer is a solid-state Hall Effect sensor, which can be used to produce a voltage proportional to an applied magnetic field and to sense polarity of the magnetic field. Another example of a magnetometer is a fluxgate magnetometer.

Based on the magnetometer output, and sometimes other sensor data, such as accelerometer outputs, the mobile device processor can compute a magnetic heading, where magnetic heading refers to the device orientation relative to the magnetic meridian that represents direction to the Earth magnetic pole. Other sensor data, such as gyroscope data or data from some other angular rate sensor, can be also used, when available, to filter the compass errors. After magnetic heading has been determined, the magnetic heading value can be converted into a True Heading value, relative to the Geographical Meridian, with the help of magnetic declination table.

A mobile device may integrate an electronic magnetic compass, such as a magnetometer, to assist in position location or navigation applications. For example, a mobile device may implement a "Point-and-click" application, with the user pointing the device to certain object, and the device software identifying the object using a determined or otherwise known location and time, the heading, and a map database.

A PMV (400) may comprise one or more LIDAR units. The LIDAR units may be single-channel LIDARs. The LIDAR units may be one or more scanning LIDARs. The LIDAR units may illuminate a target or detectable range with laser light. The LIDAR units may be capable of detecting backscattering. The light may comprise ultraviolet, visible, and/or near-infrared light to image the surrounding environment. The LIDAR units may be capable of detecting a wide range of materials. For instance, the LIDAR may detect metallic or non-metallic objects, precipitation, certain aerosols, clouds or molecules. In some embodiments, the LIDAR units may be operating at a high resolution. Any type of LIDAR may be used, such as Rayleigh LIDAR, Mie LIDAR, Raman LIDAR, Na/Fe/K LIDAR, etc. In some embodiments, the LIDAR units need not be of a mechanical scanning type of LIDAR. For example, the LIDAR units may include phase array LIDARs integrated on microchips. Advantages of phase array LIDARs include lower cost, lower weight, smaller form factor, and fewer mechanical components compared to existing scanning LIDAR systems. Phase array LIDARs are also more robust due to the lack of moving parts since the components are integrated onto microchips.

One or more cameras may be disposed on a PMV (400). The cameras may collectively form a vision sensing system. Multiple cameras may be provided. The cameras may be capable of capturing image data for environmental sensing. The cameras may be the same type of cameras or different types of cameras. In some embodiments, the cameras may include stereo cameras. Optionally, the cameras may include one or more monocular cameras. In some instances, combinations of stereo cameras and monocular cameras may be provided. The cameras may include black and white cameras. In some embodiments, the cameras may include color cameras. Any description herein of cameras may apply to any type of vision sensors, and may be referred to interchangeably as imaging devices of which examples are described below.

An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain cases provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc.). The camera may capture color images, greyscale image, infrared images, and the like. The camera may be a thermal imaging device when it is configured to capture infrared images.

A PMV may be equipped with a proximity sensor. A proximity sensor may use one or more physical phenomena to determine the distance between an object and the sensor, such as electromagnetic phenomena or ultrasonic phenomena. A proximity sensor may include capacitive sensors, capacitive displacement sensors, Doppler effect sensors, eddy-current sensors, inductive sensors, magnetic sensors, photoelectric sensors, photocell sensors, laser rangefinders, passive thermal infrared sensors, ionizing radiation sensors, sonar sensors, ultrasonic sensors, fiberoptic sensors, or Hall effect sensors. A proximity sensor may have the ability to detect objects at various ranges. In some instances, a proximity sensor may be able to detect objects at 500 ft, 100 ft, 10 ft, 1 ft, 10 centimeters (cm), or 1 cm or less.

In some embodiments, the PMV can include one or more inertial measurement units (IMUs) that can detect acceleration and rotation of the PMV. Based on information generated from the IMUs, a computing device can determine what operation zone the PMV is travelling.

In some embodiments, the PMV can include one or more sensors to detect objects near the PMV. For example, the PMV can include proximity sensors that can detect vertical structures, such as the walls of buildings. The collected proximity sensor data can be used to determine a distance from the PMV to the buildings, which can be indicative of whether the PMV is travelling on which road.

In some embodiments, the PMV can include sensors configured to identify a magnetic field created by buildings as landmarks near specific roads. As the PMV is travelling, changes to the detected magnetic field may indicate whether the PMV is travelling on which road. For example, a sensor on the scooter may manipulate the magnetic field and create a unique signature.

Other example sensors that can be disposed on the PMV (400) may include any of location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, LIDAR, time-of-movement cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors).

The sensors may have various detectable ranges. A detectable range of the sensor may include a region relative to the sensor where the sensor may collect data. The detectable range may include a distance range and/or a direction. For example, detectable range may include a maximum distance and/or minimum distance that can be read by the sensor. The minimum distance may be zero. The maximum distance may or may not be affected by environmental conditions (e.g., temperature, particulates in the air, precipitation, air pressure, noise, etc.). Direction may include an angle range. For instance, a sensor may have an angular range field of view. Different sensors may have different detectable ranges or the same detectable range.

In some embodiments, the PMV (400) can include one or more positioning sensors (e.g., global positioning system (GPS) sensors) either alone in combination with an inertial measurement unit (IMU). Based on the positioning sensors and/or the IMU sensors, the geographic position of the PMV may be determined. The accuracy geographic position of the PMV may be determined by the quality and accuracy of the GPS signal. In some cases, a high positioning accuracy sensor, such as real-time kinematic (RTK)-GPS, can be used having extremely refined positioning (e.g., centimeter-level positioning).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are remote from each other and interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Methods as described herein can be implemented by way of machine (e.g., computer processor) executable code stored on an electronic storage location of the computer system. The machine executable or machine readable code can be provided in the form of software. During use, the code can be executed by a processor. The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or "non-transitory computer-readable medium" refer to any medium that participates in providing instructions to a processor for execution. The non-transitory media may also comprise instructions located in different physical locations in a distributed system. For example, some instructions may be located on a server and other instructions may be located on one or more mobile devices for a mobile application. The mobile application and server instructions may be developed by a single entity for distribution to the mobile applications, such that a single developer produces the instructions for both the server and the mobile application.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Although the description has been described with respect to particular embodiments thereof, these particular embodiments are merely illustrative, and not restrictive. Concepts illustrated in the examples may be applied to other examples and implementations.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

We claim:

1. A method comprising:
receiving, at a server, a collection of images of parked personal mobility vehicles (PMVs) to train a machine learning model to determine whether a parked PMV is parked according to a plurality of parking rules;
generating, at the server, the machine learning model to determine whether the parked PMV is parked according to the plurality of parking rules,
wherein the machine learning model is trained to identify improper parking including any of that the parked PMV is parked too close to an edge of a sidewalk, that the parked PMV is obstructing a middle of a sidewalk, that the parked PMV is obstructing pedestrian traffic, and that the parked PMV is left upright;
receiving, by a mobile application on a mobile device, a completion indication that a user has completed a trip on the parked PMV;
requesting, from the mobile application in response to the completion indication, an image of the parked PMV;
displaying, by the mobile application, a camera interface configured to obtain the image of the parked PMV, wherein the camera interface comprises a frame for taking the image of the parked PMV;
receiving, at the mobile application based on a user input, the image of the parked PMV from the camera interface;
transmitting, by the mobile application, the image of the parked PMV to a server;
inputting, by the server, the image into the machine learning model to determine whether the parked PMV satisfies the plurality of parking rules;
generating, by the server and the machine learning model, an indication of whether the parked PMV satisfies the plurality of parking rules; and
transmitting, by the server to the mobile application, the indication of whether the parked PMV satisfies the plurality of parking rules,
wherein the indication comprises an instruction to repark the parked PMV when the parked PMV does not satisfy one or more of the plurality of parking rules,
wherein the indication comprises an instruction to the user to take another image when the machine learning model cannot determine whether the parked PMV satisfies one or more of the plurality of parking rules,
and wherein the indication comprises a finished indication when the machine learning model determines that the parked PMV satisfies the plurality of parking rules.

2. The method of claim 1, wherein the machine learning model is implemented and deployed using a machine learning framework.

3. The method of claim 1 further comprising:
displaying, by the mobile application, the instruction to take another image.

4. The method of claim 3, wherein the instruction comprises one or more of an instruction to repark the parked PMV, or capture an additional image with more lighting, different orientation or viewing distance.

5. The method of claim 1,
receiving, at the mobile application, in response to determining that the parked PMV does not satisfy one or more of the plurality of parking rules, a second image of the parked PMV from the camera interface;
transmitting, by the mobile application, the second image of the parked PMV to a server;
inputting, by the server, the second image into the machine learning model to determine whether the parked PMV satisfies the plurality of parking rules; and
generating, by the server and the machine learning model, a second indication of whether the parked PMV satisfies the plurality of parking rules;

transmitting, by the server to the mobile application, the indication of whether the parked PMV satisfies the plurality of parking rules,
wherein the indication comprises an instruction to repark the parked PMV when the parked PMV does not satisfy one or more of the plurality of parking rules.

6. A system comprising:
a server comprising a machine learning model, wherein the server is configured to:
receive an image into the machine learning model to determine whether a parked personal mobility vehicle (PMV) satisfies a plurality of parking rules;
output an indication indicating whether the parked PMV is improperly parked, or alternatively that the image is unsatisfactory; and
transmit the indication to a mobile device; and
a mobile application, on a mobile device and associated with a plurality of PMVs, wherein the mobile application is configured to:
receive a parking validation indication that a user has completed a trip with a parked PMV;
in response to receiving the parking validation indication, obtain an image of the parked PMV based on a user input to take the image;
transmit the image of the parked PMV to the server;
receive the parking validation indication from the server; and
display a message to a user based on the parking validation indication, wherein the parking validation indication comprises one or more of a finished indication, an instruction to repark the PMV, or a request for an additional image having more lighting, or different orientation or viewing distance.

7. The system of claim 6, wherein the plurality of parking rules comprises one or more of the PMV is parked too close to an edge of a sidewalk, that the PMV is obstructing a middle of a sidewalk, that the PMV is obstructing pedestrian traffic, and that the PMV is left upright.

8. The system of claim 6, wherein the mobile application is further configured to:
display a graphic indication to the user that the parking validation indication is successful.

9. The system of claim 6, wherein the mobile application is further configured to:
provide an indication to the user that the parking validation indication was not successful.

10. The system of claim 9, wherein the mobile application is further configured to:
prompt the user to repark the PMV and obtain a second image of the parked PMV.

11. The system of claim 10, wherein the mobile application is further configured to:
transmit the second image of the parked PMV to the server;
receive a second parking validation indication from the server; and
display a second message to the user based on the parking validation indication, wherein the parking validation indication comprises one or more of the finished indication, an instruction to repark the PMV, or a request for an additional image having more lighting, or different orientation or viewing distance.

12. A non-transitory computer-readable medium comprising a series of instructions to perform a method comprising:
receiving, by a mobile application on a mobile device, a completion indication that a user has completed a trip on a PMV;
requesting, from the mobile application in response to the completion indication, an image of a parked PMV;
displaying, by the mobile application, a camera interface configured to obtain the image of the parked PMV, wherein the camera interface comprises a frame for a user for taking the image;
receiving, at the mobile application, the image of the parked PMV from the camera interface;
transmitting, by the mobile application, the image of the PMV to a server;
inputting, by the server, the image into a machine learning model to determine whether the parked PMV satisfies a plurality of parking rules;
generating, by the server and the machine learning model, an indication of whether the parked PMV satisfies the plurality of parking rules; and
transmitting, by the server to the mobile application, the indication of whether the parked PMV satisfies the plurality of parking rules,
wherein the indication comprises an instruction to repark the PMV when the parked PMV does not satisfy one or more of the plurality of parking rules,
wherein the indication comprises an instruction to the user to take another image when the machine learning model cannot determine whether the PMV satisfies one or more parking rules,
and wherein the indication comprises a finished indication when the machine learning model determines that the parked PMV satisfies the plurality of parking rules.

13. The non-transitory computer-readable medium of claim 12, wherein the plurality of parking rules comprises one or more of the PMV is parked too close to an edge of a sidewalk, that the PMV is obstructing a middle of a sidewalk, that the PMV is obstructing pedestrian traffic, and that the PMV is left upright.

14. The non-transitory computer-readable medium of claim 12 further comprising instructions to perform the method comprising:
displaying a graphic indication to the user when the machine learning model determines that the parked PMV satisfies the plurality of parking rules.

15. The non-transitory computer-readable medium of claim 12 further comprising instructions to perform the method comprising:
displaying a graphic indication to the user when the machine learning model determines that the parked PMV does not satisfy the plurality of parking rules.

16. The non-transitory computer-readable medium of claim 15 further comprising instructions to perform the method comprising:
prompting the user to repark the PMV and obtain a second image of the parked PMV.

17. The non-transitory computer-readable medium of claim 16 further comprising instructions to perform the method comprising:
transmitting the second image of the parked PMV to the server;
receiving a second indication from the server; and
displaying a second message to the user based on the indication, wherein the indication comprises one or more of the finished indication, an instruction to repark the PMV, or a request for an additional image having more lighting, different orientation, or viewing distance.

18. The non-transitory computer-readable medium of claim 16, wherein the machine learning model is implemented and deployed using a machine learning framework.

19. The non-transitory computer-readable medium of claim 12 further comprising instructions to perform the method comprising:
  determining an improper parking score;
  comparing the improper parking score to a predetermined score; and
  transmitting an instruction to a user device.

20. The non-transitory computer-readable medium of claim 19, wherein the instruction comprises one or more of an instruction to repark the PMV, capture an additional image with more lighting, different orientation or viewing distance, or display a completion indication.

\* \* \* \* \*